Patented Apr. 15, 1952

2,592,954

UNITED STATES PATENT OFFICE 2,592,954

METHOD OF MAKING FLEXIBLE ABRASIVE ARTICLES

Norman P. Robie, Lewiston, N. Y., assignor to The Carborundum Company, Niagara Falls, N. Y., a corporation of Delaware No Drawing. Application December 16, 1942, Serial No. 469,232

4 Claims. (Cl. 51—295)

This invention relates to the production of abrasive articles and more particularly to the production of flexible abrasive articles such as abrasive paper, cloth and the like, and has as an object the production of improved articles of this type.

Hitherto in the process of manufacturing such articles by affixing an abrasive coating on backings such as those made of paper and/or cloth, it has been customary to use glue or varnish as the adhesive. More recently there have been used as adhesives various synthetic resins as solutions in organic solvents or in liquid form. Such resins are, however, expensive and other adhesives have been desired.

I am aware of early attempts to use sodium silicate as an adhesive in the making of abrasive-coated products and the failure of the resulting articles because of the pronounced property of the silicate adhesive to pick up moisture and/or carbon dioxide from the surrounding atmosphere with a resulting loss in strength and general deterioration of the binder. Previous efforts to remedy this defectiveness in silicate adhesives have so far provided no solution to the problem.

In accordance with my invention I provide as adhesives, for use in the production of flexible abrasive articles, soluble silicate solutions in combination with resinous materials in such ways as to overcome the aforementioned faults of soluble silicate adhesives when used alone, and which permit the production of flexible abrasive articles having hitherto unknown and improved characteristics.

Flexible abrasive articles are usually made by applying to a backing, which may be paper, cloth or a composite sheet of both paper and cloth, a layer of adhesive usually known as the making coat. Abrasive grain, such as particles of garnet, alumina silicon carbide or the like or mixtures of these, is then applied to this making coat and another application of adhesive known in the art as a sizing coat is thereupon applied.

In accordance with the present invention I have used, as an adhesive for the above-mentioned uses, soluble silicate solutions in combination with moisture-resistant, thermosetting resins, such as those of the phenol-formaldehyde type, with highly satisfactory results. I have found that sodium silicate solutions which have a specific gravity of about 1.68 and a $Na_2O:SiO_2$ molecular ratio of about 1:2 are useful for this purpose. Solutions of sodium silicates of other molecular ratios can also be used to good advantage with proper adjustment of the specific gravity and viscosity of the solutions for the purpose. These solutions may be prepared from a single silicate or from a mixture thereof. These silicate solutions when combined with resinous substances as herein set forth may be used in applying both the making coat and the sizing coat or either of these, depending upon the particular method used. The silicate component and the resin component in the present products employing their combined use can be applied in direct combination in one or more coatings, or the combination can be effected by the application of a resin coating in juxtaposition to the silicate coating.

I have found that the various disadvantages attendant upon the use of soluble silicates are overcome or avoided by the proper combination of the silicate adhesive with suitable resins which are moisture resistant and thermo-setting. The proper combination of the resin and silicate also serves to enhance the properties and behavior of both ingredients; the joint application of the two materials can be carried out by any one of several procedures. The silicate solution of the desired viscosity can be applied to the backing material as the making coat for adhering the abrasive grain to the backing, after which a final sizing coat of a moisture resistant, thermo-setting resin, such as a phenol-formaldehyde liquid resin, is applied. The sizing coat acts as a protective film which prevents the silicate undercoat or coats from picking up the moisture and/or carbon dioxide from the atmosphere and thereby losing its adhesive strength. At the same time the presence of the silicate in the making coat is beneficial to the resin sizing coat in that it accelerates the rate of cure of the resin whereupon the article can be matured by a shorter and less expensive heating period. A modified method of using resins in conjunction with soluble silicates to provide a moisture resistant adhesive for coated abrasives consists of incorporating the resin directly with the soluble silicate prior to use and then employing the silicate-resin mixture as the adhesive for both the making and the sizing coats, or for either the making or the sizing coat. Such combinations of resin and silicate have been found to be strong and tough and of improved resistance to deterioration under humid conditions. Not only does the presence of the resin serve to protect the silicate content from the detrimental influences of the surrounding atmosphere, but the silicate has the unexpected effect of promoting a more rapid cure of the resin with all the advantages resulting therefrom. The heat treatment necessary to set or cure the thermosetting resin is also beneficial with respect to further promoting the moisture resistance of the silicate.

I have found such synthetic resins as the paracumaroneindene and phenolic-aldehyde condensation product resins to be particularly well-adapted for use in imparting water-resistance and/or resistance to carbon dioxide to my abrasive articles.

Other resins which may be applied as a protective coating are vinyl resins, such as polyvinyl acetate resins, polyvinyl alcohol resins, polyvinyl alcohol-acetal resins, urea-formaldehyde resins, acrylic resins, and alkyd resins, which may be modified with oils or fatty acids if desired or convenient.

The coating of the protective material may be very thin, thus lending the silicate film additional resistance to humidity or, by using a somewhat thicker coating, a practically complete resistance to the action of water may be obtained. Such coatings, whether thick or thin, result in substantial absence of any efflorescence of the silicate film due to the action of the carbon dioxide and moisture of the air.

The use of phenolic-aldehyde condensation products in conjunction with soluble silicate adhesives is of particular interest since I have found that such resins when applied in solution or in the liquid "A" stage before the baking are cured and hardened to a very high degree during this baking in contact with the silicate. Such complete curing is a novel and unpredictable result since the time of cure, which may be as little as four hours, is much shorter than that ordinarily necessary for producing the same degree of curing in the lack of contact with the silicate. The temperatures used are also lower than those ordinarily employed.

I may utilize this cure-accelerating property of a soluble silicate in various other ways as by using a soluble silicate film as a presize for the backing, as a making coat, as a sizing coat, as a very thin layer over the sizing coat, as a thin layer between the making and sizing coat, or in a combination of these ways. The remainder of the adhesive used may be a phenolic-aldehyde condensation product resin with or without modifying agents and which may be in admixture with other adhesives which do not interfere with the curing of the phenolic resin.

As another variation of a coating employing phenolic-aldehyde condensation product resins, I have found that a resin of this type, such as "Durite S1719," admixed with a powdered soluble silicate is valuable as a sizing coat on a flexible abrasive article having a silicate making coat. Upon baking the article 1 hour at 225° F. and 1 hour at 300° F., this coating becomes sufficiently cured to give very satisfactory results. Various combinations of liquid and solid phenolic-aldehyde condensation product resins with liquid and powdered soluble silicates may also be used.

The following specific examples are given by way of illustration of the various modes of application of the joint silicate-resin binders of the present invention whereby each one of the ingredients has a beneficial effect upon the other.

Example I

Paper backing known as 130 pound cylinder paper of the kind ordinarily used in making abrasive paper is first coated with a mixture of 7 parts by weight of J grade sodium silicate and 3 parts by weight of O grade sodium silicate. The J grade silicate has a specific gravity of about 1.68 and an $Na_2O:SiO_2$ ratio of about 1:2 and the O grade silicate has a specific gravity of about 1.40 and an $Na_2O:SiO_2$ ratio of about 1:3. A coating of 80 grit fused alumina grain is then electrostatically applied to the adhesively coated surface while the adhesive is still wet.

The abrasive coated surface is then sized with a mixture consisting of 10 parts by weight of water and 90 parts by weight of liquid A stage phenol formaldehyde resin, sold under the tradename Bakelite #7534, containing about 30% volatiles.

The abrasive coated and sized paper is allowed to air dry for about 16 hours and is then baked 2 hours at 200° F. followed by 2 hours at 300° F. The phenolic resin size coat is cured to a very black state by the baking operation due to the catalytic action of the sodium silicate making coat beneath it.

Example II

A coating of 80 grit alumina abrasive grain is applied to a paper backing as in Example I except for the sizing adhesive which is applied according to the following procedure. A solution of polyvinyl alcohol resin containing 26.5% solids is applied over the silicate making coat and abrasive. The resin size coat is then cured by air drying although a short low temperature baking period is beneficial in that it assists in hardening the adhesive film. The sodium silicate making coat has a hardening insolubilizing action on the polyvinyl alcohol.

Example III

Alumina abrasive grain of 80 grit size is electrocoated onto 130 pound cylinder paper coated with sodium silicate adhesive as in Example I. The abrasive grain sizing coat adhesive differs as follows: A liquid, A stage, heat hardenable phenolic resin is mixed with commercial sodium silicate powder and water in the following proportions:

40 parts by weight liquid phenolic resin (Durite S1719)
10 parts by weight sodium silicate powder
8 parts by weight water The above ingredients are mixed cold to a smooth consistency and applied to the abrasive coated paper and the completed sized sheet material cured 1 hour at 225° F. followed by 1 hour at 300° F.

Example IV

An adhesive is prepared by mixing 3500 parts by weight of sodium silicate having an $Na_2O:SiO_2$ ratio of about 1:1.92 with 750 parts by weight of A stage, heat hardenable phenolic resin powder known as Durite #278. The stiff paste which results is thinned with 600 parts of water to provide a smooth liquid adhesive of excellent coating qualities. Paper backing known as 130 pound cylinder paper is coated with the above adhesive and 80 grit fused alumina abrasive grain electrostatically projected onto the adhesively coated paper. The abrasive coating is then sized with a sizing adhesive consisting of 3040 parts by weight of the making coat composition thinned with 1000 additional parts by weight of water.

The coating is air dried 16 hours and baked as follows:

3½ hours at 150° F.
    3 hours at 200° F.
    2 hours at 300° F.

For a more detailed description of suitable methods and apparatus for the electrostatic projection of the abrasive granules onto an adhesively coated surface as carried out in the above examples, reference is made to Patent No. 2,187,624, issued January 14, 1940, to R. L. Melton, R. C. Benner and H. P. Kirchner. The abrasive grain in the above examples, however, may be applied by gravity methods, although the more recently developed electrostatic, magnetic or mechanical methods of projection are usually preferred.

The physical properties of the coatings may be modified in various ways as, for example, by the addition of flexibilizing agents to the silicate solutions. Among such agents which can be used are polyhydric alcohols such as glycerol, mannitol, sorbitol and diethylene glycol, polyhydric alcohol-boric acid resins such as glyceryl or glycol bori-borate, alkaline resin solutions, aqueous emulsions or dispersions of flexible resins, and organic alkalies such as triethanolamine. As will be noted, certain of these flexibility modifying agents also possess adhesive properties and the use thereof will assist in the bonding of the abrasive grains.

Fillers may also be incorporated in my soluble silicate adhesives. The fillers may be inert inorganic ones such, for example, as powdered silica or organic ones such as cellulosic fibers. Such fillers permit a very slow, gradual breaking away of the dulled abrasive grit so that the cutting rate of the abrasive article is better maintained.

As it is frequently desired to modify the water resistance, activity, hardness and other properties of soluble silicate films reactive materials may be used as agents for this purpose. These materials may be solids, as for example fillers, or they may be liquids, solutions, or solids such as phenol and tannic acid. The latter may also be used in solution if desired.

Among the reactive fillers which may be used are oxides, such as those of zinc, magnesium, boron and those of the alkaline earth metals, hydroxides, such as those of magnesium and the alkaline earth metals, clay, Portland cement and various forms of calcium carbonate. These fillers react with the soluble silicates producing a thickening and a considerable resistance to the action of water. Such reactive materials may be utilized in various ways depending upon the results desired and the nature of the materials used.

A simple and effective way of securing the advantages arising from the use of reactive materials is to merely admix them with the soluble silicate adhesives. This method may be used to advantage with reactive fillers.

It is sometimes desirable, however, to localize the action of the reactive material and this may be done in a number of ways, the suitability of any particular way being determined by the result wanted. Thus, reactive fillers may be bound to the abrasive grains, using a small amount of binder, or reactive glasses or ceramic material may be sintered or fused on the surface of the abrasive grains. As other alternatives, reactive fillers may be dusted over the abrasive grain and the making coat, over the sizing coat, or may be caused to adhere to the backing as by a suitable adhesive, such as a thin starch solution, before the making coat is applied. It will be understood that various combinations of these methods may be utilized, in this way obtaining a plurality of what may be termed zones of reaction.

Among the liquids which may be used as reactive agents are solutions of acid salts of the alkali metals, soluble salts of all metals except the alkali metals, concentrated solutions of ammonium salts and ammonium hydroxide, and mineral acids. These liquids may be applied in any convenient way, as by spraying, painting, rolling, or dipping, to the backing, the making coat, or the sizing coat or to a plurality of these. It will be understood that such liquids may also be used in conjunction with reactive or inert fillers if desired.

Other reactive materials may be used which are so slowly reactive that the silicate solution is not undesirably thickened in mass before application. Such materials include salts of organic acids such as heavy metal tartrates and amino salts and the salts of higher molecular carboxylic acids and sulfonic acids, e. g., naphthalene sulfonic acid.

It is known that silicon carbide has a tendency to react with alkaline solutions with evolution of hydrogen. I may overcome this difficulty either by preventing the reaction as by coating the silicon carbide grains with films of, e. g., resins, vitrified ceramic materials, glasses, varnishes, lacquers, etc., or by roasting the silicon carbide in an oxidizing atmosphere to provide a surface film of non-reactive silica. I have also found that by employing an oxidizing material, such as potassium permanganate, which may be incorporated with the grain as a pretreatment or added to the silicate, the undesired evolution of gas may be prevented.

By the expression "soluble silicate" as used herein, is meant the water-soluble silicates of the alkali metals. The ones most commonly used are silicates of sodium but I do not wish to be limited to these since all soluble silicates are capable of being used satisfactorily in the practice of my invention.

While I have set forth my invention in some detail and have given a number of examples, I do not wish to be limited thereby except as I am limited by the scope of the appended claims.

This application is in part a continuation of co-pending application Serial No. 336,212, filed May 20, 1940, now abandoned.

I claim:

1. A method of making flexible abrasive articles comprising preparing a mixture of a soluble silicate and a moisture-resistant resin, applying said mixture to a flexible backing material, applying abrasive grain to the adhesive-coated surface, applying a size coating of an adhesive mixture of similar composition to the abrasive-coated surface, and heating the thus formed article to set the adhesive.

2. A method of making flexible abrasive articles comprising preparing a mixture of a soluble silicate and a moisture-resistant, thermosetting resin, applying said mixture to a flexible backing material, applying abrasive grain to the adhesive-coated surface, applying a size coating of an adhesive mixture of similar composition to the abrasive-coated surface, and heating the thus formed article to set the adhesive.

3. A method of making flexible abrasive articles comprising preparing a mixture of a soluble silicate and a phenolic resin, applying said mixture to a flexible backing material, applying abrasive grain to the adhesive-coated surface, applying a size coating of an adhesive mixture of similar composition to the abrasive-coated surface, and heating the thus formed article to set the adhesive.

4. A method of making flexible abrasive articles comprising applying a layer of adhesive to a flexible backing material, applying a layer of abrasive grain to the adhesive coated surface, applying a thin layer of a soluble silicate to the abrasive coated surface, sizing the abrasive coat and silicate coated surface with an adhesive protective coating comprising a moisture-resistant thermosetting resin, and heating the thus-formed article to set the resin of the protective coating.

NORMAN P. ROBIE.

REFERENCES CITED

The following references are of record in the file of this patent:

UNITED STATES PATENTS

| Number | Name | Date |
| --- | --- | --- |
| Re. 17,593 | Okie | Feb. 11, 1930 |
| 224,078 | Copeland | Feb. 3, 1880 |
| 230,202 | Sibley | July 20, 1880 |
| 1,775,631 | Carlton | Sept. 16, 1930 |
| 2,165,186 | Walker | July 4, 1939 |
| 2,224,815 | Glycofrides | Dec. 10, 1940 |

OTHER REFERENCES

Chemistry of Synthetic Resins, Ellis, vol. I, 1935, page 645.